United States Patent [19]
Gutow, Jr.

[11] 3,742,228
[45] June 26, 1973

[54] MAGNET CONTROL CIRCUIT UTILIZING SQUARE ROOT CIRCUIT AND ADDITIONAL COMPENSATION CIRCUIT

[75] Inventor: Russell S. Gutow, Jr., Mountain View, Calif.

[73] Assignee: Varian Associates, Palo Alto, Calif.

[22] Filed: Mar. 4, 1971

[21] Appl. No.: 121,115

[52] U.S. Cl...... 250/41.9 ME, 250/41.9 D, 328/144
[51] Int. Cl........................... B01d 59/48, G06g 7/20
[58] Field of Search................ 328/144; 250/41.9 G, 250/41.9 ME

[56] References Cited
UNITED STATES PATENTS

| | | | |
|---|---|---|---|
| 3,254,209 | 5/1966 | Fite et al......................... | 250/41.9 D |
| 3,510,647 | 5/1970 | Wood............................. | 250/41.9 D |
| 3,527,938 | 9/1970 | Delany........................... | 250/41.9 ME |
| 3,113,274 | 12/1963 | Utt.................................. | 328/144 |
| 3,205,347 | 9/1965 | Wright............................ | 328/144 X |
| 3,328,569 | 6/1967 | Brewster........................ | 328/144 X |
| 3,562,552 | 2/1971 | Baudino......................... | 328/144 X |

Primary Examiner—John S. Heyman
Attorney—Stanley Z. Cole and Vincent W. Cleary

[57] ABSTRACT

A magnet control circuit for the electromagnet of a mass spectrometer wherein a sweep voltage input linear with time is supplied to a square root amplifier where it is converted to a current proportional to the square root thereof, said current being utilized to energize the magnet windings and thus produce a change in magnet flux density rendering the mass numbers of the ion groups proportional to sweep time. One or more circuits are provided to by-pass the square root amplifier and produce a magnet current proportional to said sweep voltage to thereby compensate for a decreasing rate of flux density versus magnet current at higher magnet current levels.

9 Claims, 4 Drawing Figures

PATENTED JUN 26 1973 3,742,228
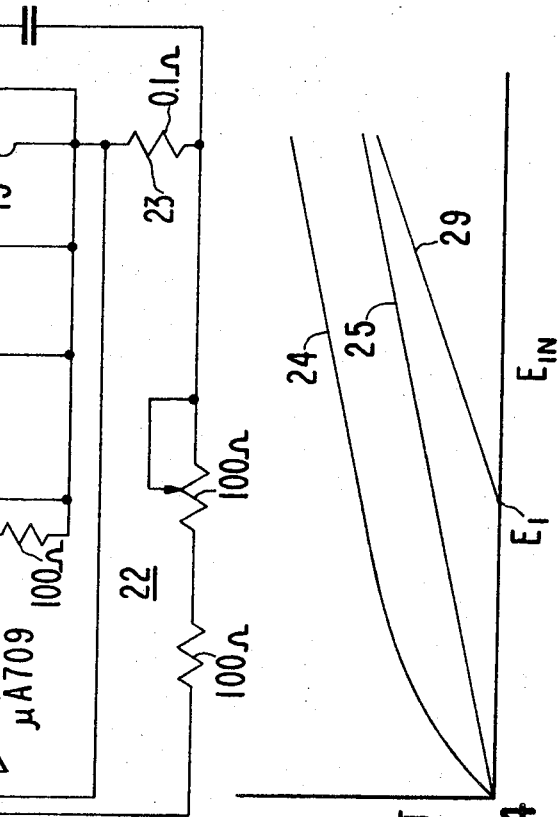
FIG.2
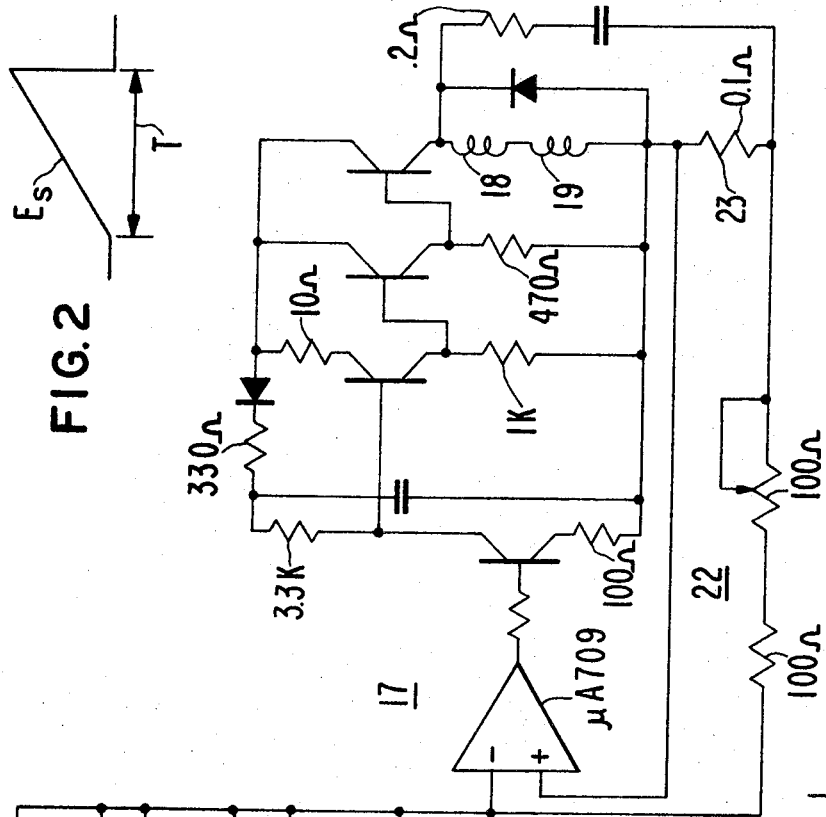
FIG.1
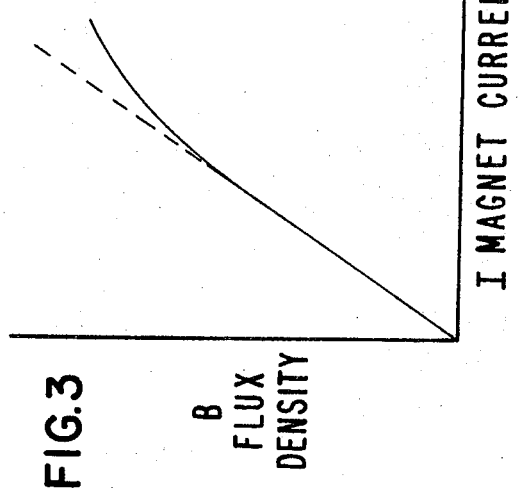
FIG.3
FIG.4
INVENTOR.
RUSSELL S. GUTOW JR.
BY
ATTORNEY

MAGNET CONTROL CIRCUIT UTILIZING SQUARE ROOT CIRCUIT AND ADDITIONAL COMPENSATION CIRCUIT

BACKGROUND OF THE INVENTION

In mass spectrometers, the gas being analyzed is first ionized, for example, by means of electron bombardment, and the positive ions are directed into an analyzer chamber where they are subjected to the influence of a magnetic field. In any given strength magnetic field, the ions will follow a path of travel which is characteristic of their mass to charge ratio, ions of different masses following different distinct paths. By sweeping the magnetic field strength, the different ion groups, i.e. ions with different mass numbers, may be made to sequentially strike a collecting detector where the ion current for each particular ion group may be measured in order of their mass number, thus giving a series of spaced-apart ion current peaks as a measure of the relative abundance of the various ion groups.

The mass number ion group brought to focus on the detector is proportional to the square of the magnetic field strength, i.e. $M/e = K_a B^2/E$ where M is the mass of the ion, $K_a$ is a constant of the analyzer, E is the energy of the ion delivered from the source, which is maintained constant, E is the ion charge and B is the flux density of the magnet. Thus, in order to obtain a linear spatial relationship between the ion peaks with time, it is necessary to vary the magnet flux density as a square root function with time.

In addition, due to saturation effects in the magnet, which is run at high current levels for economical magnet utilization, the flux density does not vary linearly with magnet current near the high end of the mass range, but its rate of change versus current decreases with increasing magnet current. Thus, the variation of the magnet flux density with time to produce the desired linear spatial relationship of the ion peaks becomes increasingly more difficult.

BRIEF SUMMARY OF THE INVENTION

In the present invention, a magnet current control circuit is provided wherein an input signal which varies in amplitude linearly with time is converted to a signal which is proportional to the square root of said input signal, said square root signal being utilized to produce a magnet current proportional thereto. Thus, the flux density of the magnet is proportional to the square root of said input signal. Since the mass number is proportional to the flux density squared, the mass number is linearly related in time to said input signal. The various ion peaks will appear in sequence equally spaced in time along a strip chart record of the detector output.

To compensate for the decrease in the rate of change of magnet flux density at higher magnet field strengths due to saturation effects in the magnet, one or more additional currents are introduced into the magnet windings proportional to the input signal, to thereby increase the flux density to maintain the desired proportionality.

DESCRIPTION OF THE DRAWINGS

FIG. 1 is a schematic diagram of one embodiment of the magnet control circuit of the present invention.

FIG. 2 is a plot of the ramp voltage input to the square root amplifier of the system.

FIG. 3 is a plot illustrating the magnet current components produced by the square root amplifier and the compensation by-pass circuits as a function of input voltage.

DESCRIPTION OF THE PREFERRED EMBODIMENT

The magnet control circuit of the present invention comprises an electronic sweep circuit 11 of conventional design which provides a ramp output $E_s$ with amplitude increasing linearly with time T as shown in FIG. 2, i.e. $E_s \alpha T$. The sweep circuit includes means for terminating the ramp at any preselected time, and thus controlling the length of T, to await initiation of the next ramp.

This ramp signal serves as the input signal to a known form of square root amplifier circuit 12 which produces an output voltage signal which varies proportionally to the square root of the input voltage; i.e. $E_{out} \alpha \sqrt{E_{in}}$ or $\sqrt{E_s}$. One suitable square root circuit is model 4126/15c marketed by Burr Brown Research Corp. of Tucson, Arizona.

In addition to the ramp input, selective voltage level inputs may also be provided, if desired, from a voltage divider circuit comprising resistors 13, 14, and 15, the junction points providing voltages of, for example, 1 volt, 2 volts, and 3 volts, representing mass numbers 100, 200, and 300, respectively. Such voltage values may be utilized as a base voltage at which the ramp output will start the sweep, or these voltage values may be used as a fixed voltage level in lieu of the varying ramp, so that the system may be set and operated starting at any desired initial mass number.

A variable voltage input to the square root amplifier 12 may also be supplied from a potentiometer circuit 16, if desired, to permit variable setting of the input voltage.

The output of the square root circuit is applied to the input of an operational amplifier circuit 17 which operates to deliver an output current I to the electrical coils 18 and 19 of the mass spectrometer electromagnet, the magnet current I being proportional to the voltage input to the operational amplifier. Since this input voltage is proportional to $\sqrt{E_{in}}$ as noted above, $I \alpha \sqrt{E_{in}} \alpha \sqrt{T}$. Also, since the magnet flux B is, to a first approximation, proportional to I, the flux $B \alpha \sqrt{T}$ and, since $M \alpha B^2$, $M \alpha T$.

Thus, the mass numbers of the ion groups are proportional to the sweep time T and thus the mass number peaks appear equally spaced in time at the detector of the system.

To compensate for the effect of saturation where B does not increase with increasing I in the same proportion as at lower field strengths, a portion of the sweep output is passed around the square root circuit 12 directly to the operational amplifier to thereby add to the magnet current and bring the slope of the magnet flux more nearly into line with the value at lower fields strengths. The saturation effect is shown in FIG. 3 which is a plot of the flux density B versus the magnet current I; the solid line is the actual flux density obtained without compensation, whereas the dotted line shows the linear relationship desired.

A first by-pass circuit comprises the resistor 21 coupled in parallel with the square root circuit 12. This by-pass circuit adds a component into the input of the operational amplifier proportional to the voltage input, $E_{in}$, to the square root circuit. Thus $I \alpha K \sqrt{E_{in}} + R22/R21R23\ E_{in}$ where the ratio $R22/R21R23$ is the ratio of the resistance of resistor circuit 22 to the resistance of resistors 21 and 23.

This additional factor adding to the magnet current I is illustrated in FIG. 4 wherein curve 24 is the component of current proportional to $\sqrt{E_{in}}$ and curve 25 is the component of current proportional to $E_{in}$ due to the by-pass circuit; the total current I is the sum of these two components. The linear component 25 has an increasing effect at the higher $E_{in}$ values and thus provides increased current I to compensate for the tendency of the rate of flux B to decrease.

To provide additional compensation if desired, a second by-pass circuit comprising the resistors 26 and 27 and the diode 28 is utilized. At values of $E_{in}$ at the input to the square root circuit below a settable value $E_1$, the diode 28 is back biased and no current passes through this second path. For values of $E_{in}$ above $E_1$, current will flow and an additional component of current proportional to $E_{in}$ is added to the magnet current I as illustrated by the curve 29 in FIG. 4. This additional component increases the magnet current at the higher end of $E_{in}$ values to aid in providing the linear flux density.

By suitable choice of the value of resistors 21, 22, 23, 25, and 26, the slopes of curves 25 and 29 may be selected as desired. Also, additional compensation by-pass circuits may be employed to add additional components of magnet current at selected starting values of $E_{in}$ to boost the magnet current at the higher end of $E_{in}$ values.

A similar pair of by-pass circuits comprising resistor 31 and resistors 32 and 33 and diode 34 are provided for introducing a compensating current into the magnet windings when the potentiometer circuit 16 is utilized to change the voltage level input to the square wave circuit 12 for initial mass number setting. The resistor circuit 31 functions similarly to resistor circuit 21 to provide a linear compensation current of the type illustrated by curve 25 while the circuit components 32, 33, and 34 function to provide a compensation current similar to that illustrated by curve 29.

A like pair of by-pass circuits comprising resistor 35 and resistors 36 and 37 and diode 38 are provided for introducing a compensation current similar to those illustrated by curves 25 and 29, respectively, when the voltage input to the square root circuit 12 is changed by the voltage divider circuit 13–15.

What is claimed is:

1. A magnet control circuit comprising a magnet circuit responsive to a magnet current for controlling the strength of the magnetic field, an input voltage, means for converting said input voltage to an output proportional to the square root of said input, and amplifier means responsive to said square root output for producing said desired magnet current for controlling the strength of said magnet, whereby said magnet current varies proportionally to the square root of said controllable input voltage, wherein said circuit further comprises means for additionally introducing a voltage into said amplifier means proportional to said input voltage, whereby said magnet current varies proportionally to said additional voltage as well as to the square root of said controllable input voltage.

2. A magnet control circuit as claimed in claim 1 wherein said circuit means comprises a circuit coupled in parallel with said square root conversion means between said input voltage source and said amplifier means.

3. A magnet control circuit as claimed in claim 1 including second circuit means operative after said input voltage has reached a predetermined amplitude level for introducing another additional voltage into said amplifier means, whereby said magnet field strength varies proportionally to said other additional voltage.

4. A magnet control circuit as claimed in claim 3 wherein said first circuit means and said second circuit means comprise a pair of by-pass circuits coupled in parallel with said square root conversion means between said input signal means and said amplifier means.

5. Magnetic field control apparatus comprising, electromagnet means having an air gap and a magnetic field in said air gap, said magnetic field being responsive to magnet current, and said electromagnet introducing a non-linearity at high magnetic fields in said responsive relationship between said magnet current and said magnetic field;
   means for generating a linearly varying voltage;
   means for generating a compensation voltage;
   magnet current generator means responsive to said linearly varying voltage and to said compensation voltage for establishing a magnet current which causes said magnetic field strength to be directly proportional to the square root of said linearly varying voltage through both linear and non-linear electromagnet regions.

6. Magnetic field control apparatus according to claim 5 wherein said means for generating a linearly varying voltage comprises a ramp generator with a selectable period and selectable voltage level.

7. A method of exciting the magnetic field of a mass spectrometer to focus ions on the detector in such a manner that the mass number of said focused ions is a linear function of time, comprising generating a linearly increasing ramp function; applying said ramp function to a magnet current generator means, generating a magnet current which is proportional to the square root of the instantaneous value of said ramp function; applying said magnet current to the magnet windings to excite said magnetic field of said mass spectrometer.

8. A method according to claim 7 further comprising generating a compensation function to correct for electromagnet non-linearity at high field values, applying said compensation function to said magnet current generator whereby said magnet current varies proportionally to said square root of said instantaneous value of said ramp function as well as to said compensation function.

9. A method according to claim 7 wherein said compensation function becomes larger for larger values of said ramp function.

* * * * *